US012599838B2

(12) United States Patent
Eder et al.

(10) Patent No.: US 12,599,838 B2
(45) Date of Patent: Apr. 14, 2026

(54) APPARATUS AND METHODS FOR RECORDING AND REPORTING ABUSIVE ONLINE INTERACTIONS

(71) Applicant: Sony Interactive Entertainment Inc., Tokyo (JP)

(72) Inventors: Michael Eder, London (GB); Nicola Penny Ann Cavalla, London (GB); Lawrence Green, London (GB); Calum Armstrong, London (GB); Rosario Leonardi, London (GB); Nima Karshenas, London (GB); Alan Murphy, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 161 days.

(21) Appl. No.: 18/491,101

(22) Filed: Oct. 20, 2023

(65) Prior Publication Data

US 2024/0139625 A1     May 2, 2024

(30) Foreign Application Priority Data

Oct. 31, 2022    (GB) ...................................... 2216130

(51) Int. Cl.
| | |
|---|---|
| *A63F 13/497* | (2014.01) |
| *A63F 13/75* | (2014.01) |
| *A63F 13/79* | (2014.01) |
| *G06F 3/14* | (2006.01) |
| *G06T 11/60* | (2006.01) |

(52) U.S. Cl.
CPC ............ *A63F 13/497* (2014.09); *A63F 13/75* (2014.09); *G06F 3/1454* (2013.01); *G06T 11/60* (2013.01); *A63F 13/79* (2014.09); *G06T 2200/24* (2013.01)

(58) Field of Classification Search
CPC ............................ A63F 13/497; G06F 3/1454
See application file for complete search history.

(56) References Cited

U.S. PATENT DOCUMENTS

| | | |
|---|---|---|
| 11,266,912 B2 | 3/2022 | Dorn |
| 2009/0174702 A1 | 7/2009 | Garbow |

(Continued)

OTHER PUBLICATIONS

Combined Search and Examination Report for corresponding GB Application No. 2216130, 8 pages, dated Jun. 27, 2023.

(Continued)

*Primary Examiner* — Shivang I Patel
(74) *Attorney, Agent, or Firm* — Kilpatrick Townsend & Stockton LLP

(57) ABSTRACT

A data processing apparatus includes processing circuitry to generate images of a computer-generated environment for display to a first user, storage circuitry to temporarily store at least some of the images, where the storage circuitry is configured to temporarily store a respective image in dependence upon one or more storage conditions, receiving circuitry to receive user input data indicative of selection by a first user of a predetermined function for reporting abusive interaction by another user associated with the computer-generated environment, recording circuitry to generate a respective recording in response to the user input data, the respective recording comprising at least some of the images stored by the storage circuitry and output circuitry to output the respective recording.

18 Claims, 3 Drawing Sheets

(56)  References Cited

U.S. PATENT DOCUMENTS

| 2018/0207535 A1 | 7/2018 | Seo | |
| 2018/0316716 A1 | 11/2018 | Kozloski | |
| 2020/0186897 A1 | 6/2020 | Dareddy | |
| 2021/0370183 A1* | 12/2021 | Dorn | A63F 13/79 |
| 2021/0402304 A1 | 12/2021 | Dorn | |
| 2022/0096937 A1 | 3/2022 | Dorn | |
| 2022/0111297 A1* | 4/2022 | Rudi | A63F 13/85 |

OTHER PUBLICATIONS

Extended European Search Report for corresponding EP Application No. 23200570.2, 7 pages, dated Mar. 11, 2024.

* cited by examiner

210 Processing circuitry

240 Recording circuitry

220 Storage circuitry

250 Output circuitry

230 Receiving circuitry

200

100

101-a 101-b 101-n

210 — Processing circuitry

240 — Recording circuitry

220 — Storage circuitry

250 — Output circuitry

230 — Receiving circuitry

260 — Modifying circuitry

510 — Generate

520 — Store

530 — Receive

540 — Generate

550 — Output

APPARATUS AND METHODS FOR RECORDING AND REPORTING ABUSIVE ONLINE INTERACTIONS

FIELD OF THE DISCLOSURE

The present disclosure relates to apparatus, systems and methods for recording content. In particular, the present disclosure relates to apparatus, systems and methods for generating images of a computer-generated environment for display and obtaining a recording including at least some of the images of the computer-generated environment.

BACKGROUND OF THE INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Data processing apparatus for generating content for output to users can include functionality for allowing users to capture recordings of portions of the generated content. An example of this is a video game console which generates video content for display to a user and stores the video content. In some cases, a user may manually specify portions of the stored video content to be used for a recording, such as a highlight recording of the user's game play. Alternatively, other cases may involve using a first-in first-out storage mechanism for storing a most recent segment of the content and a user can request creation of a highlight so that the most recent segment is used for the highlight recording.

With the increasing popularity of virtual spaces for allowing users to meet and interact, there is a need to improve safety for users of such shared virtual environments. In particular, users can be subjected to a range of abusive interactions through video and/or audio content presented to the user. Examples of potential abusive interactions may including harassment, homophobia and racism among others. It is therefore desirable to provide improved safety for users of virtual environments.

It is in this context that the present disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

Figure 1:
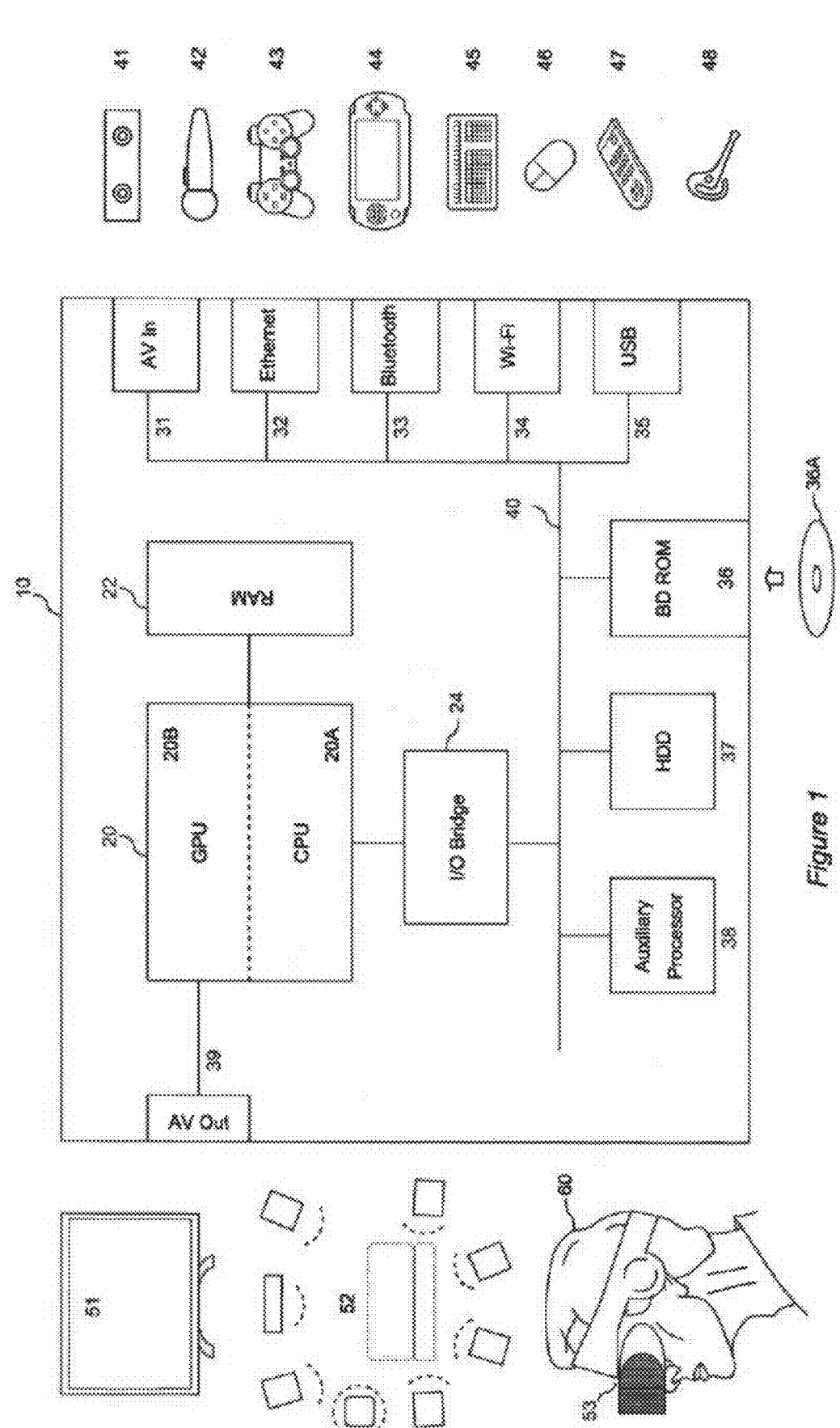
FIG. 1 is a schematic diagram illustrating an example of an entertainment device.

Embodiments of the invention will now be described, by way of example only, with reference to the accompanying drawings, in which:

Referring now to the drawings, wherein like reference numerals designate identical or corresponding parts throughout the several views, FIG. 1 schematically illustrates an example entertainment device such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ® or DualSense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of an entertainment device suitable for performing image processing for generating images for display. The entertainment device may for example generate images for display by a display device such as the television 51 and/or the head mounted display unit 53.

Figures 2, 3:
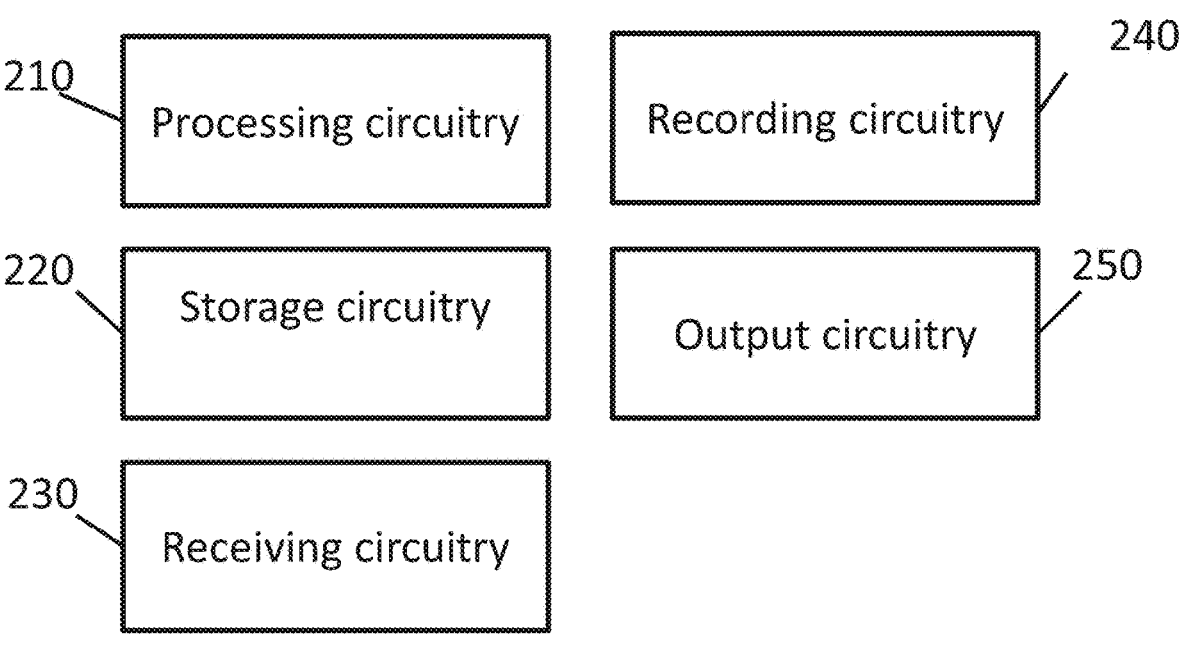
FIG. 2 is a schematic diagram illustrating a data processing apparatus.
FIG. 3 is a schematic diagram illustrating a system.

FIG. 2 schematically illustrates a data processing apparatus in accordance with embodiments of the disclosure. The data processing apparatus 200 comprises: processing circuitry 210 to generate images of a computer-generated environment for display to a first user; storage circuitry 220 to temporarily store at least some of the images, wherein the storage circuitry is configured to temporarily store a respective image in dependence upon one or more storage conditions; receiving circuitry 230 to receive user input data indicative of selection by the first user of a predetermined function for reporting abusive interaction by another user associated with the computer-generated environment; recording circuitry 240 to generate a respective recording in response to the user input data, the respective recording comprising at least some of the images stored by the storage circuitry; and output circuitry 250 to output the respective recording. In some embodiments of the disclosure, the data processing apparatus 200 may be provided as part of an entertainment device such as that described with reference to FIG. 1. More generally, the data processing apparatus 200 may be provided as part of a game console, smartphone device, laptop or a general purpose computing device. In such cases, the data processing apparatus 200 may generate images for display to a first user. User input data for a second user may be received via a network (for example, using peer-to-peer techniques or one or more servers) and used by the data processing apparatus 200 for generating the images for display to the first user so as to update an avatar associated with the second user in the images to thereby allow interaction within the computer-generated environment represented in the images. Similarly, the second user may be provided with another corresponding data processing apparatus for generating images for display to that second user using user input data from the first user, such that interaction between the two users within the computer-generated environment is facilitated.

In some embodiments of the disclosure, the data processing apparatus 200 may be provided as part of a server apparatus. The server apparatus can be configured to communicate, via one or more networks, with user devices associated with at least two or more users (e.g. the first user and second user). Hence more generally, the data processing apparatus 200 may be provided as part of a server and/or provided as part of a user's device.

FIG. 3 schematically illustrates an example of a system comprising the data processing apparatus 200. The system comprises the data processing apparatus 200 which communicates with the client devices 101a, 101b, 101n via the network 100. In this example, the data processing apparatus 200 may be a server apparatus responsible for generating images for display to users of an online application having a computer-generated environment, such as an online video game. The data processing apparatus 200 may thus receive user input data from users associated with the client devices 101a, 101b, 101n and generate images of a computer-generated environment for display to the users so that the users can interact with each other within a virtual space. The client devices 101a, 101b, 101n may be devices such as the entertainment device described with reference to FIG. 1, or other similar devices having display functionality such as a smartphone or tablet device or a general purpose computing device connected to a display unit. Hence, images of the computer-generated environment can be generated at the data processing apparatus 200 and output via the network 100 for display by the client devices associated with the users.

In some examples, the data processing apparatus 200 may be a game sever apparatus for generating images of a computer-generated environment for an online video game. Each user may for example control a respective avatar within the computer-generated environment and images generated for display to a given user have a viewpoint corresponding to an avatar for that given user whilst images generated for display to another user have a different viewpoint corresponding to another avatar for the another user.

More generally, the processing circuitry 210 is configured to generate images of a computer-generated environment for display to one or more users. In the following discussion, an example of generating images for display to a first user associated with the computer-generated environment is provided, however, it will be appreciated that images may be generated for one or more users to provide one or more users with a visual representation of the computer-generated environment.

In this disclosure, references to a computer-generated environment refer to a computer-generated environment that may be a 2D computer-generated environment or a 3D computer-generated environment. The processing circuitry 210 can be configured to generate images of the computer-generated environment for display to the first user which may be either a 2D representation or a 3D representation of the computer-generated environment. In some embodiments of the disclosure, the processing circuitry 210 can be configured to generate images of a 3D virtual reality environment for display to the first user. In this disclosure, unless stated otherwise, references to a virtual reality environment per se (or a virtual environment) refer to a computer-generated environment that may be either a 2D or 3D computer-generated environment. The techniques of the present disclosure are applicable for images of virtual reality environments for allowing a user of a virtual reality environment to report abusive interaction(s) with other users in the virtual reality environment.

Images of the computer generated environment can be stored by the storage circuitry 220, and the respective recording can provide a 2D or 3D (stereoscopic) representation. Hence more generally, a virtual environment or virtual space (e.g. virtual game world) which can be explored by users can be represented in the images generated by the processing circuitry 210.

The processing circuitry 210 can be configured to generate a sequence of images for display to a first user to provide a video representation of the computer-generated environment. The processing circuitry 210 can generate the images according to any suitable frame rate which may be fixed or variable. A position and orientation of a viewpoint of the images can be controlled responsive to user inputs to allow the first user to change the viewpoint. For example, the first user inputs may be used to control an avatar with respect to the environment such that the viewpoint follows the avatar. The viewpoint of the images may correspond to a so-called first person viewpoint or third person viewpoint for the avatar, for example.

The processing circuitry 210 is thus operable to generate a sequence of images representing the computer-generated environment from a user-controlled viewpoint. The user (e.g. first user in this case) can thus control the viewpoint to observe different parts of the computer-generated environment. Whilst viewing the images generated by the processing circuitry 210, the user may encounter other users associated with the environment (specifically, avatars being controlled by other users) and thus interact with other users. For example, users may interact via their respective avatars which can be represented visually in the generated images. Users may also interact through audio by providing speech inputs. For example, positional audio techniques may be used so that speech inputs from a user can be provided to another user depending on the proximity of their respective avatars and optionally a relative orientation of the avatars.

Consequently, the first user can interact with one or more other users of the computer-generated environment based on at least the images generated by the processing circuitry 210 being displayed to the first user and optionally based on corresponding audio data.

Whilst viewing the images, the first user may potentially be subjected to one or more abusive interactions from one or more other users associated with the computer-generated environment.

Abusive online interactions can be particularly harmful and distressing for those being targeted. For example, an abusive interaction may comprise harassment by another user due to invasion of personal space within the environment and/or one or more avatar gestures being performed and/or verbal abuse. Hence more generally, an abusive interaction can observed in the images of the environment and in some cases may also be provided via the corresponding audio.

Such interactions can significantly detract from a user's experience of a computer-generated environment. Even when reporting an offending user by informing a moderator of an identity (e.g. a username) of an offending user, the reporting user may not be able to provide supporting evidence and the offending user may go unpunished. This can be particularly problematic in that the presence of even a very small number of offending users in a shared virtual space can affect the experiences of many users and lead to users not participating further in the virtual space.

In embodiments of the disclosure, the data processing apparatus 200 comprises the storage circuitry 220 configured to temporarily store at least some of the images generated for display to the first user by the processing circuitry 210. Either all or at least some of the images that have been generated for display to the first user can be temporarily stored by the storage circuitry 220. The storage circuitry is configured to temporarily store a respective image in dependence upon one or more storage conditions. The one or more storage conditions are discussed in more detail later, but generally the storage circuitry uses at least one storage condition so that a respective image that has been generated for display to the first user is stored following the respective image being generated and whether the image continues to be stored is dependent on whether the image satisfies the storage condition. Hence, for a respective image frame currently being stored, the storage condition is used to determine whether the respective image frame currently being stored is to be evicted from the storage circuitry.

In addition to the storage circuitry 220, the data processing apparatus comprises the receiving circuitry 230 to receive the user input data indicative of selection by the first user of the predetermined function for reporting abusive interaction by another user associated with the computer-generated environment. The first user may for example provide a user input, such as selection of a graphical user interface (GUI) element, or pressing a specific button of a handheld controller, or performing a gesture with the controller if position tracking is implemented for the controller, so as to select the predetermined function for reporting abusive interaction. The first user can thus select the predetermined function for reporting abusive interaction, and in response to the user input data the recording circuitry 240 is configured to generate a respective recording comprising at least some of the image frames stored by the storage circuitry 220 at the time at which the user input data is received.

In this way, the storage circuitry 220 can pre-emptively store at least some of the generated images and use one or more of the storage conditions for identifying whether to continue storing a currently stored image (or put differently whether to evict a currently stored image). In response to the user input data indicating that the first user wants to report an abusive interaction, the recording circuitry 240 is operable to use at least some of the images currently stored by the storage circuitry 220 to generate a respective recording including images representing the abusive interaction. The output circuitry 240 is configured to output the respective recording generated by the recording circuitry 240 and the output may take a variety of different forms, as discussed in more detail below.

Images temporarily stored by the storage circuitry can thus be used for creation of a recording for assisting the first user in reporting an abusive interaction. The storage circuitry 220 may temporarily store each of the images generated by the processing circuitry or may temporarily store some of the images generated by the processing circuitry. In some cases, it may be more computationally efficient for the storage circuitry to temporarily store some (a subset) of the images generated by the processing circuitry. For example, whilst a VR experience may require a frame rate of X Hz (e.g. 120 Hz) for an immersive experience, the recording is intended to allow an abusive interaction to be reported and in some cases may be generated to have a lower frame rate. This may be achieved by the storage circuitry temporarily storing every other image generated by the processing circuitry or, more generally, by the storage circuitry temporarily storing one in every N image frames, where N is an integer value greater than or equal to two. Alternatively or in addition, the recording circuitry may generate the recording by selecting every other image that is temporarily stored by the storage circuitry at the time at which the user input data corresponding to the selection of the predetermined function for reporting abuse is received or, more generally, by selecting one in every N image frames, where N is an integer value greater than or equal to two.

It will be appreciated that the output circuitry 240 can also be configured to output the images generated for display to the first user to provide the first user with a sequence of images for viewing the computer generated environment or other circuitry may similarly be provided for outputting the images to the first user. In some examples, outputting the images for display to the first user may comprise outputting the images via a wired or wireless communication. In some examples, the data processing apparatus (e.g. when provided as part of a device such as a smartphone or a tablet device) may comprise a display unit for outputting images for display to the user. Hence more generally, images generated for display to the first user can be output to the first user and at least some of the generated images can be temporarily stored by the storage circuitry.

The data processing apparatus 200 can generate the respective recording using at least some of the currently stored images being stored by the storage circuitry. At least some of the currently stored images may include an image of an avatar associated with another user, and may also potentially include a visual representation of an abusive interaction with the avatar. The respective recording can be used for a range of purposes, including identifying the offending user so that the identity of the offending user can be reported to a moderator for further action and/or outputting the recording for display to the offending user to potentially deter future abusive behaviour. Generally, if another user is made aware that their abusive behaviour has been recorded (and can potentially be recorded again in the future) this can deter future abusive behaviour for at least some abusive users. Potential uses of the respective recording are discussed in more detail later.

For example, in the case of the first user being subjected to an abusive interaction by a second user, the first user can select the predetermined function for reporting the abusive interaction and accordingly at least some of the previously output images that were previously output to the first user and which are currently stored by the storage circuitry 220 can be included in the generated recording. The generated recording, which has a high likelihood of including an image of an avatar associated with the second user, can be output for use in reporting the abuse by the second user.

The images temporarily stored by the storage circuitry 220 represent a group of temporarily stored images that can be used for generating the respective recording. As explained above, images are stored by the storage circuitry and one or more storage conditions can be used to determine whether the storage circuitry continues to store an image.

In some embodiments of the disclosure, a storage condition comprises whether the storage circuitry is fully occupied. The storage circuitry may for example comprise buffer storage circuitry comprising volatile memory such as random access memory and may operate according to a first-in first-out scheme so that a most recently displayed image is stored by overwriting an oldest image in the storage circuitry. Hence, images generated by the image processing circuitry can be stored, and once the storage is in a fully occupied state an oldest image can be overwritten with a most recently displayed image. Consequently, a most recent portion of the sequence of displayed images can be stored by the storage circuitry 220. For example, the storage circuitry 220 may have a storage size for storing the last 20 minutes of the content generated for display to the first user.

In some embodiments of the disclosure, the one or more storage conditions comprise one or more from the list consisting of: (i) whether the respective image has been stored for a period of time that is greater than or equal to a predetermined period of time; and (ii) whether an avatar within the respective image is not represented in a subsequent generated image of the computer-generated environment for display to the first user for a predetermined period of time (also referred to as a second predetermined period of time); and (iii) whether a current separation distance in the computer-generated environment between the avatar within the respective image an avatar associated with the first user is greater than or equal to a threshold distance.

Alternatively or in addition to the one or more storage conditions comprising a condition of whether the storage circuitry is in a fully occupied state, the one or more storage conditions may comprise any of the conditions i), ii) and/or iii) listed above.

Whether a respective image has been stored by the storage circuitry for a period of time that is greater than or equal to a predetermined period of time may be used as a storage condition. Once the predetermined period of time has elapsed, the respective image frame, which is deemed unlikely to be of relevance for generating the recording for reporting the abuse, can be evicted from the storage circuitry 220. For example, the predetermined period of time may be set to a value in the range 0.5 to 5 minutes. Therefore whilst the storage circuitry may for example have capacity for storing image frames representing up to e.g. 20 minutes of playback time, the present disclosure realises that in the case of an abusive interaction the user is likely to report the abuse promptly after the commencement of the abuse and that images stored for more than the predetermined period of time are unlikely to be associated with the abuse and thus unlikely to be of use for generating the recording. Hence, in some examples the above mentioned predetermined period of time may be used as the storage condition and may be set to correspond to an amount of time that is shorter than a total playback time supported by the storage circuitry.

Alternatively or in addition, whether an avatar within the respective image is not represented in a subsequent generated image of the computer-generated environment for display to the first user for a predetermined period of time may be used as a storage condition. The sequence of images generated for display to the first user may include various features within the computer-generated environment. Another user (also referred to as a second user) maybe represented by a second avatar within the images displayed to the first user. In the case of the another user being abusive towards the first user, it is expected that the first user will decide to select the predetermined function for reporting the abusive interaction either whilst viewing the second avatar or within a predetermined period of time following the first user last viewing the second avatar. Hence, computer vision techniques can be used to detect an avatar included in a given image currently stored by the storage circuitry and when the avatar is not represented within another subsequently generated image for a predetermined period of time following the given image, then the given image can be evicted from the storage circuitry. Alternatively or in addition, metadata may be stored with the images indicating which other players/avatars are visible and/or audible, at that time for use in determining whether to evict an image frame from the storage circuitry. Hence, for example, when a given avatar was last viewed e.g. more than 90 seconds ago the stored images including the given avatar can be evicted from the storage circuitry as it is considered that the given avatar is unlikely to be the subject of an abuse report by the first user. It will be appreciated that such a storage condition can be implemented for any avatar that is viewed by the first user, and may in some cases be implemented in parallel for multiple avatars viewed by the first user.

Hence for example, if the second avatar is viewed at a time T1-T2, and then not viewed for a predetermined period of time, then the group of images corresponding to the time interval T1-T2 can be evicted from the storage circuitry. However, if the second avatar is viewed at the time T1-T2 and subsequently viewed at a time T3-T4, if the amount of time between T2 and T3 is less than the predetermined period of time, then the group of images T1-T2 and T3-T4 can be continued to be stored. Timestamp information may be associated with the images stored by the storage circuitry for assisting in this operation. Of course, if the first user frequently encounters the second user then the storage circuitry may store a significant number of images relating to the second user. However, any of the above mentioned storage conditions based on whether an image has been stored for a predetermined period of time and/or whether the storage is in a fully occupied state can be used so that most recent images of the second user are preferentially retained in the storage circuitry.

Alternatively or in addition, whether a current separation distance in the computer-generated environment between the avatar within the respective image and an avatar associated with the first user is greater than or equal to a threshold distance may be used as a storage condition. Therefore, alternatively or in addition to relying on an elapsed time since an avatar was viewed (as discussed above), a current separation distance between the avatar of the another user and the avatar of the first user may be used so that in response to the current separation distance being greater than or equal to the threshold distance, any images including the avatar can be evicted from the storage circuitry. Hence more generally, the storage circuitry is configured to temporarily store a respective image in dependence upon one or more storage conditions. The one or more storage conditions can assist in retaining images that are likely to be of use for generating the recording for reporting abusive interaction(s) whilst allowing efficient use of storage by evicting images that are unlikely to be of use.

Alternatively or in addition, the storage circuitry may store the last N minutes of images together with information (either within the images or as metadata) enabling identification of other players/avatars visible (or optionally audible) within the image, and if a user reports a particular player/their avatar) as abusive, then all instances of that avatar being visible (or optionally audible) within the image buffer may be identified, or optionally all instances up to a predetermined previous time, or up to a gap of a predetermined length or the like, as discussed above.

As discussed previously, the output circuitry outputs the respective recording generated by the recording circuitry and this may take a variety of different forms. In the following discussion, the term output encompasses the output circuitry being configured to output the recording for display by a local display device, as well as being configured to output the recording via a wireless communication to output the recording for display by another device. The recording may be output via a wired or wireless communication. For example, the data processing apparatus 200 may be a server apparatus and the output circuitry can be configured to output the respective recording via one or more wireless communication networks.

In some embodiments of the disclosure, the output circuitry is configured to output the respective recording for display to the first user. At least some of the generated images which have already been displayed to first user can be temporarily stored and used to generate the respective recording in the manner described previously. The generated recording thus includes images from a viewpoint of the first user. The recording can thus be output to the first user so that a previous abusive interaction from the viewpoint of the first user can be played back for review.

In some embodiments of the disclosure, the output circuitry is configured to output the respective recording for display to the first user and one or more other users. The recording can thus be output to the first user and one or more other users, such as a friend of the first user, and/or a moderator and/or a second user that is being reported, so that a previous abusive interaction from the viewpoint of the first user can be played back for review.

In some embodiments of the disclosure, the generated recording may be output for display to the first user and a second user that is represented in the respective recording and being reported by the first user. The second user (and/or one or more other users) can therefore be informed that the abusive interaction has been recorded. As mentioned above, if another user is made aware that their abusive behaviour has been recorded this can potentially deter future abusive behaviour for at least some abusive users. In addition, the second user's device (e.g. such as that described in FIG. 1) can playback the recording so that the second user reviews the interaction. In particular, the second user is able to view the recording of the abusive interaction from the viewpoint of the first user (i.e. the user subjected to the abuse) which may be more effective in demonstrating to the second user how their interactions are perceived by other users.

In some embodiments of the disclosure, the one or more other users comprises a moderator of the computer-generated environment. Alternatively or in addition to outputting the recording to the second user (the offending user), the output circuitry can be configured to output the recording to a moderator of the computer-generated environment. The moderator can thus view the recording and potentially take action with respect to the second user who's avatar is represented in the recording. For example, the moderator may issue a warning or even remove the second user from participating in the computer-generated environment. In some cases, the moderator may add the recording to a historical record maintained for the second user for logging abusive behaviour. This is discussed in more detail later.

In some embodiments of the disclosure, the output circuitry is configured to firstly output the respective recording for display to the first user, and wherein in response to user input data indicative of a confirmation input by the first user with respect to the respective recording, the output circuitry is configured to output the respective recording for display to one or more of the other users. Hence, as an initial stage the first user can review the recording to decide whether the recording should be output to one or more other users. In some cases, the first user may have selected to report abusive behaviour and upon subsequent review of the recording may realise that they have misunderstood the other user or that they feel differently upon review. Therefore, the first user can review the recording and in response to user input data indicative of a confirmation input by the first user with respect to the respective recording for confirming that the respective recording is of an abusive interaction, the output circuitry can output the respective recording for display to one or more of the other users. Hence, in some embodiments the output circuitry is configured to output the respective recording for display to the first user and one or more other users by firstly outputting the respective recording to the first user and then, in response to the user input data indicative of a confirmation input by the first, outputting the respective recording to one or more of the other users.

In some embodiments of the disclosure, the output circuitry is configured to simultaneously output the respective recording for display to the first user and one or more of the other users. When outputting the respective recording to one or more of the other users, the respective recording may be simultaneously output to the first user (this may be performed after the first user has initially reviewed the recording or this may be the first time that the first user observed the recording). A shared replay session can be provided in which both parties (the first user and the second user that is being reported) can view the respective recording together. Optionally, a chat function may be provided for allowing communication between the users during the replay session.

To output the respective recording to one or more of the other users, the recording circuitry and/or output circuitry may encode the recording for streaming to the other user using any suitable encoding scheme. The stream may be routed to the other user (specifically, the device of the other user) via the network 100, optionally via a central server hosting the virtual environment. The data processing apparatus 200 or server may identify the client device corresponding to the reported player in order to route the streamed recording. As a preliminary step, the data processing apparatus or server may send a notification to the one or more other user's devices (e.g. 101-a, 101-b, 101-n), requesting that the device pauses or interrupts the other user(s) own play within the environment in order to display the received stream.

In some examples, game state data may be analysed to identify a username or other identification information associated with an avatar in an image of the recording and streaming of images to the user associated with the avatar can be interrupted to instead stream the recording for display to that user. For example, when a single avatar associated with another user is included in the recording, it may automatically be determined that the another user is being reported by the first user. However, in some examples a number of avatars may be represented in the recording, and one or more operations may be performed for identifying a respective avatar that is to be reported. In some examples, the recording generated by the recording circuitry may firstly be output for display to the first user and selection by the first user of an avatar (or two or more avatars) within one or more images of the recording maybe used to identify an avatar and thus the associated user that is to be reported. Alternatively or in addition, the recording generated by the recording circuitry may firstly be output for display to the first user and selection by the first user of a user from a list of users currently in the virtual environment and/or currently within a predetermined distance of the avatar of the first user and/or recently viewed by the first user (e.g. viewed within a predetermined period of time) may be used to identify a user that is to be reported, such that the recording can subsequently be output to the device associated with the identified user.

Hence more generally, the output circuitry can be configured to output the recording to one or more user devices associated with one or more other users, in which an identity of at least one other user may be determined in response to a selection by the first user with respect to one or more of: an image of an avatar included in the recording; and a list of current users associated with the virtual environment.

The above discussion relates to generating the respective recording using images that have been generated for display to the first user, in which the respective recording can provide the first user's viewpoint for the abusive interaction. The following describes techniques in which the processing circuitry 210 is configured to generate images for the first user as well as images for the second user and potentially further viewpoints not related to either the first or second users.

As explained with reference to FIG. 3, in some embodiments of the disclosure the data processing apparatus may be a server apparatus. The images generated by the processing circuitry 210 may thus comprise first images of the computer-generated environment for display to the first user and second images of the computer-generated environment for display to the second user. The following discussion refers to examples including the first user and the second user, however, it will be appreciated that images can be generated for any number of users.

The processing circuitry can be configured to generate first images for display to the first user which have a first viewpoint associated with the first user and to generate second images for display to the second user which have a second viewpoint associated with the second user. The storage circuitry can be configured to store at least some of the first and second images using any of the previously described techniques. Hence more generally, the previously described techniques for temporarily storing images for the first user which can be used for creating the recording when the first user reports an abusive interaction can similarly be performed with respect to the second images so that the second user may similarly report an abusive interaction and create a respective recording comprising at least some of the second images. In some examples, the storage circuitry may comprise first buffer storage circuitry for storing at least some of the first images generated by the processing circuitry and second buffer storage circuitry for storing at least some of the second images generated by the processing circuitry. Moreover, in some examples, respective buffer circuitry may be provided for storing images associated with respective users, and respective buffer circuitry can temporarily store images in dependence upon one or more of the storage conditions, and a respective recording can be generated therefrom.

Whilst the storage circuitry can temporarily store at least some of the second images, potentially for assisting the second user in reporting an abusive interaction, the second images may also be used for assisting the first user in reporting an abusive interaction with the second user. In some cases, in response to the user input data indicative of selection by the first user of the predetermined function for reporting abusive interaction with the second user, the recoding circuitry can be configured to generate a first recording comprising at least some of the first images from the perspective of the first user and to also generate a second recording comprising at least some of the second images from the perspective of the second user. Therefore, two recordings of the abusive interaction from the perspective of the first user (i.e. the user reporting the abusive interaction) and the perspective of the second user (i.e. the user responsible for the abusive interaction) can be generated. It will be appreciated that whilst the above discussion refers to the first user reporting abuse by the second user, the same techniques may be applied to allow the second user to report abuse by the first user.

More generally, in some embodiments of the disclosure in response to the user input data indicative of selection by the first user of the predetermined function for reporting abusive interaction by the second user, the recording circuitry is configured to generate at least: a first respective recording comprising at least some of the first images stored by the storage circuitry; and a second respective recording comprising at least some of the second images stored by the storage circuitry, and wherein the output circuitry is configured to output at least one of the first respective recording and the second respective recording for display to the first user and to output at least one of the first respective recording and the second respective recording for display to the second user.

The output circuitry can output the first and second respective recordings using a number of different possibilities. In some cases, the output circuitry may output the second respective recording for display to the first user and output the first respective recording for display to the second user. Therefore, the user reporting the abuse can view the abusive user's perspective of the interaction and the user that is being reported can view the reporting user's perspective of the interaction. This may provide the abusive user with a new perspective of the interaction and may better demonstrate to the abusive user how their interaction is perceived by another user. Similar to as describe above, a shared replay session can be provided in which both parties (the first user and the second user that is being reported) can view the recordings simultaneously, optionally with a chat function.

In some cases, the output circuitry may output the first respective recording and the second respective recording for display to the first user (for example in a side-by-side arrangement) and simultaneously output the first respective recording and the second respective recording for display to the second user. Therefore, both the user reporting the abuse and the user that is being reported can view the two perspectives of the abusive interaction. Similar to as describe above, a shared replay session can be provided in which both parties (the first user and the second user that is being reported) can view the respective first and second recordings together. Optionally, a chat function may be provided for allowing communication between the users during the replay session.

In some embodiments of the disclosure, the output circuitry is configured to simultaneously output at least one recording to both the first user and the second user, and the output circuitry is configured to output a user feedback image after the respective recording has been output, and wherein the receiving circuitry is configured to receive user input data indicating user feedback for each of the users and the data processing apparatus is configured to store the respective recording in association with the user feedback for each of the users. Hence, the two users can view at least one recording (e.g. both view the first recording, or both view the second recording, or the first user views the second recording while the second user views the first recording, or both view both recordings) and upon ending the playback of the recording, the user feedback image can be output to request the users to provide feedback. For example, the user feedback image may comprise a plurality of graphical user interface elements selectable by the users. In some examples, the user feedback screen may provide selectable elements so that each user can select to agree that the interaction was abusive or select to disagree. Alternatively or in addition, the user feedback screen may allow each user to indicate on a numeric scale (e.g. 1 to 10) a level of abuse associated with the recorded interaction. Therefore, users can provide their feedback and the at least one recording can be stored in association with the user feedback for each of the users. In a simplest case, the first recording may be output to both users and the first recording can be stored in association with the user feedback for the users. The data processing apparatus 200 may comprise second storage circuitry (e.g. memory such as flash memory or other non-volatile memory) for storing the recording(s), and the second storage circuitry can further store the user feedback in association with the recording(s). Whilst the data processing apparatus 200 may in some examples store the recording(s) after output to the users, in some cases the recordings may be output to another device such as a moderator device for storage by that device.

In some embodiments of the disclosure, the data processing apparatus is configured to disable further output of the second images of the computer-generated environment for display to the second user until the user input data indicating user feedback for the second user is received. Hence, the first user can potentially select to report the abusive interaction with the second user and in some cases the generated recording can be output for display to the second user and output of further images of the computer-generated environment to the second user can be disabled until a time at which user feedback from the second user is received. For example, processing by the processing circuitry 210 may be disabled and/or output by the output circuitry 250 of images generated for display to the second user may be disabled during a time period whilst waiting for the user feedback. Consequently, output of images for display to the second user can be disabled and the data processing apparatus can be configured to start to output images for display to the second user in response to receiving the user feedback from the second user. In this way, by disabling output of images to the second user, there is an improved likelihood that the second user will provide their feedback. As explained in more detail later, such feedback information may be stored in association with a recording for review by one or more moderators.

As explained above, outputting the first recording (including images generated for display to the first user) to the second user may be effective in demonstrating to the second user how their interactions are perceived by other users. However, in some cases users may wish to have a level of anonymity when reporting another user. Providing a level of anonymity may also increase a likelihood of users deciding to report offending users. Therefore, in some embodiments another respective recording including the abusive interaction can be generated which does not use the first images having the viewpoint of the first user to thereby improve the likelihood of the identity of the first user remaining unknown to the abusive user. For example, a plurality of virtual cameras may be arranged with respect to the computer-generated environment for providing other viewpoints and such images can be stored by the storage circuitry and used for generating another respective recording. Such other viewpoints may be spectator viewpoints arranged with fixed positions and orientations so as to observe one or more predetermined portions of the computer-generated environment. In some examples, one or more other viewpoints may be provided with respect to the viewpoint associated with the first images so as to include an image of the first user's avatar and the surroundings from one or more different perspectives. Alternatively or in addition, such spectator viewpoints may be controlled by one or more spectators (users that do not actively participate in the virtual environment and are not represented by an avatar). In this way, other viewpoints may be provided for capturing interactions between the first user and other users from another perspective. Images generated in accordance with such other viewpoints may be used for generating recordings in response to reporting an abusive interactions and may in some examples be generated using a lower image resolution and/or lower frame rate than the first images generated for display to the first user. In some examples, a plurality of viewpoints may be provided relative to the first user and in response to selection by the first user of the predetermined function for reporting an abusive interaction, a respective viewpoint including one or more avatars within the field of view of the first avatar may be selected for use in generating the recording. The other viewpoint could for example be chosen dynamically to encompass avatars being looked at and/or avatars within audible range and/or prioritising avatars that move or message/speak within a certain radius of the user.

Hence more generally, in some embodiments of the disclosure the images generated by the processing circuitry further comprise third images of the computer-generated environment generated in accordance with one or more other viewpoints of the virtual environment, and in response to the user input data indicative of selection by the first user of the predetermined function for reporting abusive interaction by another user, the recording circuitry is configured to generate another respective recording comprising at least some of the third images stored by the storage circuitry.

In some embodiments of the disclosure, the one or more other viewpoints may comprise one or more of: a spectator viewpoint having a fixed positon and orientation within the computer-generated environment; a spectator viewpoint controlled responsive to inputs from a spectator user not represented by an avatar within the computer-generated environment; and one or more viewpoints having a fixed positon and orientation with respect to a viewpoint associated with the first images.

For example, in the case of a virtual reality environment (which may have a 2D or 3D presentation in the generated images) comprising a large number of respective users and their associated avatars, such as a massively multiplayer online game (MMO), a plurality of users may be in a vicinity of an abusive user. In response to a given user of the plurality of users selecting to report the abusive user, a recording can be generated using at least some of the images generated for one or more of the other viewpoints. The recording can thus be output to the abusive user (and/or to a moderator user) and this provides a level of security for the reporting user. Of course, the abusive user when viewing the recording may attempt to guess which of the plurality of users is responsible for reporting the abusive user, however, with increasing numbers of users there is an improved level of anonymity.

The above techniques refer to using one or more other viewpoints (e.g. spectator viewpoints) to allow a recording to be generated which can improve the level of anonymity for users when reporting abusive users and/or provide a different perspective for the abusive interaction. In some examples to be discussed below, image processing operations may be performed with respect to a recording (e.g. any of the first, second or third recordings) to replace an image of an avatar with an image of another avatar. For example, the second recording including the second images from the perspective of the second user may be processed to replace one or more avatars. This may assist in providing a level of anonymity for a reporting user. In particular, if the second recording is output to the second user, then replacing one or more avatars in the second images may hinder the second user from determining the identity of the reporting users. In some examples, the second recording may be stored for output to the second user at a later time, such as upon ending a game session associated with the virtual environment or even hours, days or weeks later, and replacement of one or more avatars can thus assist in providing anonymity for the reporting user.

Alternatively or in addition, image processing operations may be performed with respect to a recording to replace an image of an avatar with an image of another avatar so that the avatar of the abusive user is substituted for the avatar of the user that is reporting the abusive user. For example, the first recording (when including images having a third person viewpoint of the first user's avatar) may be processed to replace the image of the first user's avatar with the image of the second user's avatar. Alternatively or in addition to this, the second recording (from the perspective of the second user) may be processed to replace the image of the avatar of the first user with the image of the avatar of the second user. Alternatively or in addition to this, the third recording (from the perspective of the other viewpoint) may be processed to replace the image of the avatar of the first user with the image of the avatar of the second user. Consequently, a recording that has been modified by modifying circuitry can be output to the second user such that the second user is provided with a view of their own avatar being the recipient of the abuse. This may be more effective in demonstrating to the second user how their interactions are perceived by other users.

Similarly, in some cases in addition to replacing the image of the first avatar associated with the first user with the image of the second avatar associated with the second user, image processing operations may be performed to replace the image of the second avatar with the image of the first avatar. In other words, the first avatar and the second avatar can be substituted with each other. Consequently, the modified recording (e.g. any of the first, second or third recordings) can be output to the second user so that the second user can view the abusive interaction in which their avatar is abused by the avatar of the first user. This may provide the second user with a more hard-hitting and emotive appreciation of how their interaction was perceived by the first user.

Figure 4:
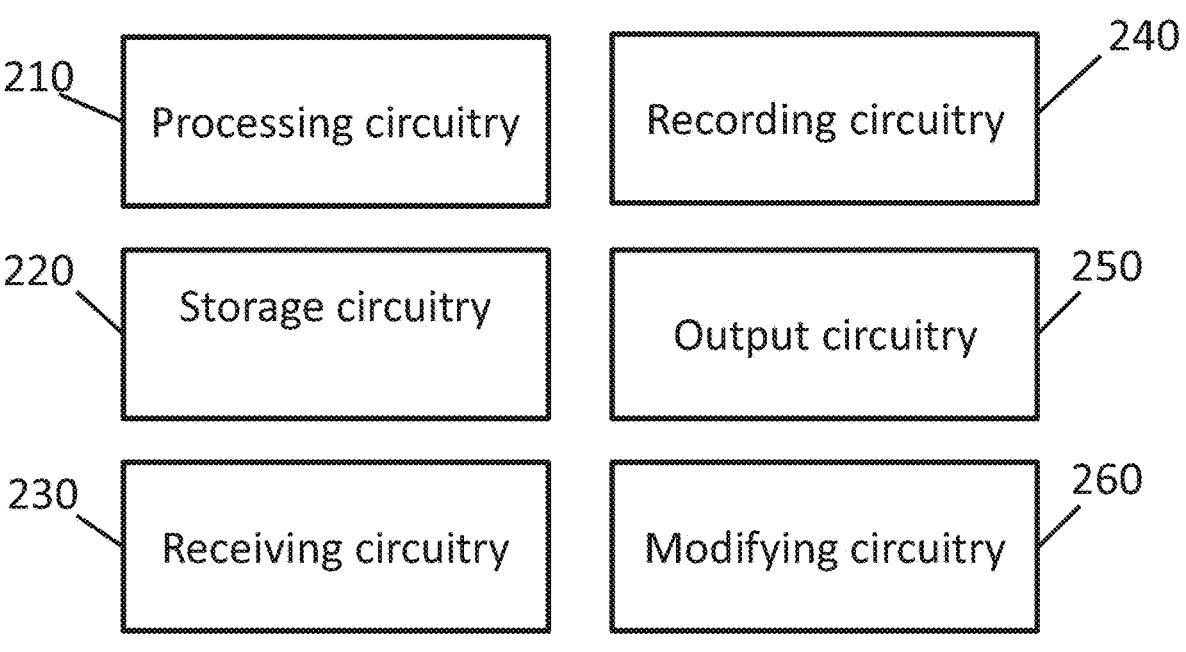
FIG. 4 is a schematic diagram illustrating another data processing apparatus comprising modifying circuitry.

Hence, referring to FIG. 4 in some embodiments of the disclosure, the data processing apparatus 200 further comprises modifying circuitry 260 to modify at least one of the first respective recording, the second respective recording and the third respective recording to replace an image of an avatar included in at least one of the first, second and third respective recordings with an image of another avatar.

Hence, the recording circuitry can generate a respective recording and the modifying circuitry can modify the respective recording by replacing at least one image of an avatar with an image of a different avatar to thereby generate a modified version of the respective recording. The modified version of the respective recording (also referred to as a modified recording) can be output by the output circuitry to any of the first and/or one or more of the other users using the techniques discussed previously In some embodiments of the disclosure, the modifying circuitry is configured to replace an image of an avatar associated with the first user with an image of an avatar associated with the second user.

In some embodiments of the disclosure, the modifying circuitry is configured to modify a respective recording including an image of a first avatar associated with the first user and an image of a second avatar associated with the second user by interchanging (substituting) the image of the first avatar with the image of the second avatar. For example, if the first or second recording corresponds to a third person viewpoint, then both the first avatar and the second avatar may be included within the recording. Similarly, the third recording from the other viewpoint (e.g. spectator viewpoint) may include both the first avatar and the second avatar. The two avatars can be exchanged with each other and, as mentioned previously, this can provide the second user with a recording in which their own avatar is subjected to the abusive interaction.

The modified recordings generated by the modifying circuitry can be output by the output circuitry in accordance with any of the techniques discussed above with respect to the recordings generated by the recording circuitry. Optionally, the data processing apparatus may comprise the second storage circuitry for storing the recording(s) and/or modified recording(s). Alternatively or in addition, the data processing apparatus may be configured to store the recording(s) and/or modified recording(s) to an external storage device. For example, in response to the recording circuitry generating the respective recording(s) (and/or the modifying circuitry generating the modified recording(s)) the output circuitry may output the recording(s) and/or modified recordings to an external storage device.

In some embodiments of the disclosure, the receiving circuitry is further configured to receive user input data indicative of selection by the first user of a type of abusive interaction and the data processing apparatus is configured to store the respective recording in association with information indicative of the type of abusive interaction. Optionally, the data processing apparatus is further configured to store the respective recording in association with the information indicative the type of abusive interaction and information indicative of an identity of the another user. In addition to selecting the predetermined function for reporting the abusive interaction by the another user, the first user can also select a type of the abusive interaction. For example, in response to the selection of the predetermined function for reporting the abusive interaction, the image processing circuitry may generate an image (e.g. a reporting image) for display to the first user indicating a plurality of types of abusive interaction. For example, types such as sexual harassment, racism, homophobia, and so on may for example be displayed to allow user selection of the type of abuse associated with the interaction. The information indicative of the type of abusive interaction can thus be stored in association with the recording.

Alternatively or in addition, in some examples the output circuitry can be configured output a respective recording and information indicative of the type of abusive interaction. The respective recording and the associated information may be output to another device for storage thereby, such as a device associated with a moderator of the virtual environment.

Generally, speaking recordings can be stored in association with information indicative of the type of abusive interaction and this can be reviewed by a moderator.

In some cases, information indicative of an identity of the another user being reported can be stored in association with the recording. For example, computer vision techniques may be used to extract, when present, a username associated with an avatar in an image of the recording. Alternatively, information associated with the virtual environment, such as game state data, may be analysed to identify a username or other identification information associated with an avatar in an image of the recording.

Therefore, recordings can be stored in association with information indicative of the type of abusive interaction and also information indicative of an identity of the user being reported. A historical record may be maintained, e.g. by an admin server or other similar device, to maintain a record of the recordings associated with a given user. The recordings can therefore be reviewed by system moderators and can be used to flag users that are frequently reported and/or frequently reported for a given type of abuse. Moderators can therefore take action with respect to such offending users, such as removing the user from the virtual environment or restricting access to one or more portions of the virtual environment. In some examples, as part of the replay/review by a moderator, advice could be offered, and in some cases advice specific to the type of abuse may be offered. This could even be viewed as an opportunity for education prior to (or in addition to) punishment.

In some embodiments of the disclosure, the storage circuitry is configured to store audio data in association with the images stored by the storage circuitry, and wherein the respective recording comprises at least some of the images stored by the storage circuitry and the corresponding audio data for those images. The generated images are output to the first user along with accompanying audio. The audio may for example comprise sounds associated with sound sources in the virtual environment. For example, in the case of a video game, an audio processor may be provided as part of the data processing apparatus 200 or another associated apparatus for generating audio data for sound sources in the video game. Alternatively or in addition, the audio may comprise streamed audio from one or more other users represented in the virtual environment. Users can provide speech inputs detected by microphones and audio signals generated by the users' processing devices can be streamed and output to the first user using known digital audio signal processing techniques. For example, any suitable voice over Internet Protocol (VoIP) may be used to deliver audio to the first user. As explained above, position audio techniques may be used so that the first user can receive audio associated with other nearby avatars within the virtual environment.

Hence more generally, at least some of the images generated and displayed to the first user and the associated audio data can be stored by the storage circuitry for use in generating the recording. The recording circuitry can use the audio data and image data stored by the storage circuitry and an abusive interaction can be observed in the images of the recording and/or may be audible in the audio of the recording generated by the recording circuitry.

In some embodiments of the disclosure, the corresponding audio data comprises speech input data from at least the another user associated with the computer-generated environment. Therefore, speech data from another user that is output to the first user can be temporarily stored by the storage unit and potentially included in the recording generated by the recording circuitry.

Figure 5:
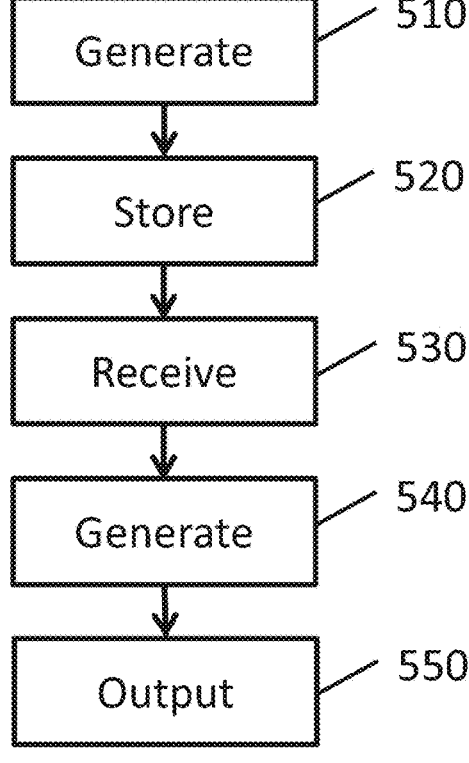
FIG. 5 is a schematic flowchart illustrating a data processing method.

FIG. 5 is a schematic flowchart illustrating a data processing method. The method comprising: generating (at a step 510) images of a computer-generated environment for display to a first user; temporarily storing (at a step 520), by storage circuitry, at least some of the images, wherein a respective image is temporarily stored depending on one or more storage conditions; receiving (at a step 530) user input data indicating selection by the first user of a predetermined function for reporting abusive interaction by another user associated with the computer-generated environment; generating (at a step 540) a respective recording in response to the user input data, the respective recording comprising at least some of the images stored by the storage circuitry; and outputting (at a step 550) the respective recording.

In some examples, an apparatus may comprise: receiving circuitry to receive images of a computer-generated environment generated for display to a first user; storage circuitry to temporarily store at least some of the images, wherein the storage circuitry is configured to temporarily store a respective image in dependence upon one or more storage conditions; receiving circuitry to receive user input data indicative of selection by the first user of a predetermined function for reporting abusive interaction by another user associated with the computer-generated environment; recording circuitry to generate a respective recording in response to the user input data, the respective recording comprising at least some of the images stored by the storage circuitry; and output circuitry to output the respective recording.

The abovementioned apparatus may receive images generated by another data processing apparatus (such as that described with reference to FIGS. 2 and 4) via a wired and or wireless communication. The storage circuitry, receiving circuitry, recording circuitry and output circuitry can have the same functionality as described above with reference to FIGS. 2 and 4. For example, the abovementioned apparatus may be provided as part of a monitoring server for receiving images of a computer-generated environment generated for display to one or more users and generating one or more recordings based on the temporarily stored images. Alternatively or in addition, the abovementioned apparatus may be provided as part of a user's entertainment device.

Techniques similar to that discussed above may be performed with respect to an 'audio-only' environment. Audio recordings for reporting abusive interaction can be generated for such an audio-only' environment using broadly similar techniques. Hence, in one example an audio data processing apparatus may comprise: audio processing circuitry to generate audio of an audio-only environment for output to a user; audio storage circuitry to temporarily store at least some of the audio; receiving circuitry to receive user input data indicative of selection by the user of a predetermined function for reporting abusive interaction by another user associated with the audio-only environment; audio recording circuitry to generate a respective audio recording in response to the user input data, the respective audio recording comprising at least some of the audio stored by the audio storage circuitry; and audio output circuitry to output the respective audio recording.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The presently-disclosed arrangement may be implemented in accordance with any of the following numbered clauses.

Clause 1. A data processing apparatus comprising: processing circuitry to generate images of a computer-generated environment for display to a first user; storage circuitry to temporarily store at least some of the images, wherein the storage circuitry is configured to temporarily store a respective image in dependence upon one or more storage conditions; receiving circuitry to receive user input data indicative of selection by the first user of a predetermined function for reporting abusive interaction by another user associated with the computer-generated environment; recording circuitry to generate a respective recording in response to the user input data, the respective recording comprising at least some of the images stored by the storage circuitry; and output circuitry to output the respective recording.

Clause 2. The data processing apparatus according to clause 1, wherein the output circuitry is configured to output the respective recording for display to the first user.

Clause 3. The data processing apparatus according to clause 2, wherein the output circuitry is configured to output the respective recording for display to one or more other users.

Clause 4. The data processing apparatus according to clause 3, wherein the one or more other users comprise at least one of a user that is represented in the respective recording and being reported by the first user and a moderator of the computer-generated environment.

Clause 5. The data processing apparatus according to clause 3 or clause 4, wherein the output circuitry is configured to firstly output the respective recording for display to the first user, and wherein in response to user input data indicative of a confirmation input by the first user with respect to the respective recording, the output circuitry is configured to output the respective recording for display to one or more of the other users.

Clause 6. The data processing apparatus according to any one of clause 3 to 5, wherein the output circuitry is configured to simultaneously output the respective recording for display to the first user and one or more of the other users.

Clause 7. The data processing apparatus according to any preceding clause, wherein the data processing apparatus is a server apparatus and the images generated by the processing circuitry comprise first images of the computer-generated environment for display to the first user and second images of the computer-generated environment for display to a second user.

Clause 8. The data processing apparatus according to clause 7, wherein in response to the user input data indicative of selection by the first user of the predetermined function, the recording circuitry is configured to generate at least: a first respective recording comprising at least some of the first images stored by the storage circuitry; and a second respective recording comprising at least some of the second images stored by the storage circuitry, and wherein the output circuitry is configured to output at least one of the first respective recording and the second respective recording for display to the first user and to output at least one of the first respective recording and the second respective recording for display to the second user.

Clause 9. The data processing apparatus according to clause 8, further comprising modifying circuitry to modify at least one of the first respective recording and the second respective recording to replace an image of an avatar included in at least one of the first and second respective recordings with an image of another avatar.

Clause 10. The data processing apparatus according to clause 9, wherein the modifying circuitry is configured to replace an image of an avatar associated with the first user with an image of an avatar associated with the second user.

Clause 11. The data processing apparatus according to any of clauses 7 to 9, wherein the images generated by the processing circuitry further comprise third images of the computer-generated environment generated in accordance with one or more other viewpoints of the computer-generated environment, and in response to the user input data indicative of selection by the first user of the predetermined function, the recording circuitry is configured to generate another respective recording comprising at least some of the third images stored by the storage circuitry.

Clause 12. The data processing apparatus according to clause 11, wherein the one or more other viewpoints comprise one or more of: a spectator viewpoint having a fixed positon and orientation within the computer-generated environment; a spectator viewpoint controlled responsive to inputs from a spectator user not represented by an avatar within the computer-generated environment; and one or more viewpoints having a fixed positon and orientation with respect to a viewpoint associated with the first images.

Clause 13. The data processing apparatus according to clause 7 when dependent on clause 6, wherein the output circuitry is configured to output a user feedback image after the respective recording has been output, and wherein the receiving circuitry is configured to receive user input data indicative of user feedback for each of the users and the data processing apparatus is configured to store the respective recording in association with the user feedback for each of the users.

Clause 14. The data processing apparatus according to clause 13, wherein the data processing apparatus is configured to disable further output of the second images of the computer-generated environment for display to the second user until the user input data indicative of user feedback for the second user is received.

Clause 15. The data processing apparatus according to any preceding clause, wherein the one or more storage conditions comprise one or more from the list consisting of: whether the respective image has been stored for a period of time that is greater than or equal to a predetermined period of time; and whether an avatar within the respective image is not represented in a subsequent generated image of the computer-generated environment for display to the first user for a predetermined period of time; and whether a current separation distance in the computer-generated environment between the avatar within the respective image and an avatar associated with the first user is greater than or equal to a threshold distance.

Clause 16. The data processing apparatus according to any preceding clause, wherein the storage circuitry is configured to store audio data in association with the images stored by the storage circuitry, and wherein the respective recording comprises at least some of the images stored by the storage circuitry and the corresponding audio data.

Clause 17. The data processing apparatus according to clause 16, wherein the corresponding audio data comprises speech input data from at least the another user associated with the computer-generated environment.

Clause 18. The data processing apparatus according to any preceding clause, wherein the receiving circuitry is further configured to receive user input data indicative of selection by the first user of a type of abusive interaction and the data processing apparatus is configured to store the respective recording in association with information indicative of the type of abusive interaction.

Clause 19. A computer-implemented method comprising: generating images of a computer-generated environment for display to a first user; temporarily storing, by storage circuitry, at least some of the images, wherein a respective image is temporarily stored depending on one or more storage conditions; receiving user input data indicating selection by the first user of a predetermined function for reporting abusive interaction by another user associated with the computer-generated environment; generating a respective recording in response to the user input data, the respective recording comprising at least some of the images stored by the storage circuitry; and outputting the respective recording.

Clause 20. Computer software which, when executed by a computer, causes the computer to carry out the method of clause 19.

The invention claimed is:

1. A data processing apparatus comprising:
processing circuitry to generate images of a computer-generated environment for display to a first user;
storage circuitry to temporarily store at least some of the images, wherein the storage circuitry is configured to temporarily store a respective image in dependence upon one or more storage conditions;
receiving circuitry to receive user input data indicative of selection by the first user of a predetermined function for reporting an abusive interaction by a second user associated with the computer-generated environment;
recording circuitry to generate a respective recording in response to the user input data, the respective recording comprising at least some of the images stored by the storage circuitry in which the second user is represented; and
output circuitry to output the respective recording for display to the first user, and in response to user input data indicative of a confirmation input by the first user with respect to the respective recording, output the respective recording for display to the second user;
wherein the output circuitry is configured to output a user feedback image after the respective recording has been output, and wherein the receiving circuitry is configured to receive user input data indicative of user feedback from each of the users and the data processing apparatus is configured to store the respective recording in association with the user feedback from each of the users.

2. The data processing apparatus according to claim 1, wherein the output circuitry is configured to output the respective recording for display to one or more other users.

3. The data processing apparatus according to claim 2, wherein the one or more other users comprise a moderator of the computer-generated environment.

4. The data processing apparatus according to claim 2, the output circuitry is further configured to output the respective recording for display to the one or more other users in response to the user input data indicative of the confirmation input by the first user.

5. The data processing apparatus according to claim 1, wherein the output circuitry is configured to simultaneously output the respective recording for display to the first user and the second user in response to the user input data indicative of the confirmation input by the first user.

6. The data processing apparatus according to claim 1, wherein the data processing apparatus is a server apparatus and the images generated by the processing circuitry comprise first images of the computer-generated environment for display to the first user and second images of the computer-generated environment for display to the second user.

7. The data processing apparatus according to claim 6, wherein in response to the user input data indicative of selection by the first user of the predetermined function, the recording circuitry is configured to generate at least:
a first respective recording comprising at least some of the first images displayed to the first user and stored by the storage circuitry; and
a second respective recording comprising at least some of the second images displayed to the second user and stored by the storage circuitry, and
wherein the output circuitry is configured to output the first respective recording and the second respective recording for display to the first user and to output at least one of the first respective recording and the second respective recording for display to the second user.

8. The data processing apparatus according to claim 7, further comprising modifying circuitry to modify at least one of the first respective recording and the second respective recording to replace an image of an avatar included in at least one of the first and second respective recordings with an image of another avatar.

9. The data processing apparatus according to claim 8, wherein the modifying circuitry is configured to replace an image of an avatar associated with the first user with an image of an avatar associated with the second user.

10. The data processing apparatus according to claim 6, wherein the images generated by the processing circuitry further comprise third images of the computer-generated environment generated in accordance with one or more other viewpoints of the computer-generated environment, and in response to the user input data indicative of selection by the first user of the predetermined function, the recording circuitry is configured to generate another respective recording comprising at least some of the third images stored by the storage circuitry.

11. The data processing apparatus according to claim 10, wherein the one or more other viewpoints comprise one or more of:

a spectator viewpoint having a fixed position and orientation within the computer-generated environment;

a spectator viewpoint controlled responsive to inputs from a spectator user not represented by an avatar within the computer-generated environment; and one or more viewpoints having a fixed position and orientation with respect to a viewpoint associated with the first images.

12. The data processing apparatus according to claim 6, wherein the data processing apparatus is configured to disable further output of the second images of the computer-generated environment for display to the second user until the user input data indicative of user feedback from the second user is received, and start to output the second images for display to the second user in response to receiving the user feedback from the second user.

13. The data processing apparatus according to claim 1, wherein the one or more storage conditions comprise one or more from the list consisting of:

whether the respective image has been stored for a period of time that is greater than or equal to a predetermined period of time; and whether an avatar within the respective image is not represented in a subsequent generated image of the computer-generated environment for display to the first user for a predetermined period of time; and whether a current separation distance in the computer-generated environment between the avatar within the respective image and an avatar associated with the first user is greater than or equal to a threshold distance.

14. The data processing apparatus according to claim 1, wherein the storage circuitry is configured to store audio data in association with the images stored by the storage circuitry, and wherein the respective recording comprises at least some of the images stored by the storage circuitry and the corresponding audio data.

15. The data processing apparatus according to claim 14, wherein the corresponding audio data comprises speech input data from the second user associated with the computer-generated environment.

16. The data processing apparatus according to claim 1, wherein the receiving circuitry is further configured to receive user input data indicative of selection by the first user of a type of abusive interaction and the data processing apparatus is configured to store the respective recording in association with information indicative of the type of abusive interaction.

17. A computer-implemented method comprising:

generating images of a computer-generated environment for display to a first user;

temporarily storing, by storage circuitry, at least some of the images, wherein a respective image is temporarily stored depending on one or more storage conditions;

receiving user input data indicating selection by the first user of a predetermined function for reporting an abusive interaction by a second user associated with the computer-generated environment;

generating a respective recording in response to the user input data, the respective recording comprising at least some of the images stored by the storage circuitry in which the second user is represented;

outputting the respective recording for display to the first user;

receiving user input data indicative of a confirmation input by the first user with respect to the respective recording;

outputting, in response to receiving the user input data indicative of the confirmation input by the first user, the respective recording for display to the second user;

outputting a user feedback image after the respective recording has been output;

receiving user input data indicative of user feedback from each of the users; and storing the respective recording in association with the user feedback from each of the users.

18. A non-transitory computer readable storage medium comprising computer software which, when executed by a computer, causes the computer to carry out a method comprising:

generating images of a computer-generated environment for display to a first user;

temporarily storing, by storage circuitry, at least some of the images, wherein a respective image is temporarily stored depending on one or more storage conditions;

receiving user input data indicating selection by the first user of a predetermined function for reporting an abusive interaction by a second user associated with the computer-generated environment;

generating a respective recording in response to the user input data, the respective recording comprising at least some of the images stored by the storage circuitry in which the second user is represented;

outputting the respective recording for display to the first user;

receiving user input data indicative of a confirmation input by the first user with respect to the respective recording;

outputting, in response to receiving the user input data indicative of the confirmation input by the first user, the respective recording for display to the second user;

outputting a user feedback image after the respective recording has been output;

receiving user input data indicative of user feedback from each of the users; and storing the respective recording in association with the
user feedback from each of the users.

* * * * *